United States Patent [19]

Takahashi et al.

[11] Patent Number: 4,642,527
[45] Date of Patent: Feb. 10, 1987

[54] IN-LINE COLOR PICTURE TUBE APPARATUS WITH DYNAMIC CONVERGENCE CORRECTION DEVICE

[75] Inventors: Koji Takahashi; Machio Kawashima, both of Mobara, Japan

[73] Assignee: Hitachi, Ltd., Tokyo, Japan

[21] Appl. No.: 820,906

[22] Filed: Jan. 16, 1986

Related U.S. Application Data

[63] Continuation of Ser. No. 372,328, Apr. 27, 1982.

[30] Foreign Application Priority Data

Apr. 30, 1981 [JP] Japan .................................. 56-63939

[51] Int. Cl.⁴ ......................... H01J 29/70; H01J 29/76
[52] U.S. Cl. .................................... 315/368; 335/213; 313/412; 313/431
[58] Field of Search ................ 315/368; 335/212, 213; 313/412, 431

[56] References Cited

U.S. PATENT DOCUMENTS

| | | | |
|---|---|---|---|
| 3,898,520 | 8/1975 | Gerritsen et al. | 315/370 |
| 4,027,219 | 5/1977 | Van Alphen et al. | 315/368 |
| 4,220,897 | 9/1980 | Barten et al. | 315/368 |
| 4,227,122 | 10/1980 | Fujisawa et al. | 315/368 |

FOREIGN PATENT DOCUMENTS

71723 6/1976 Japan .

Primary Examiner—Theodore M. Blum
Attorney, Agent, or Firm—Charles E. Pfund

[57] ABSTRACT

There is provided an in-line color picture tube apparatus with a dynamic convergence correction device. Dynamic convergence correction means is disposed between a self-convergence deflection yoke and a static convergence correction magnet assembly which are mounted on the neck portion of the tube. The dynamic convergence correction means comprises a support member made of a non-magnetic substance, eight coil assemblies having cores fixedly disposed on the support member concentrically of the tube axis with mutual equal circumferential spacings, and coils wound on the cores. The coils are connected in such a manner as to generate a four-pole magnetic field having a horizontal axis, a six-pole magnetic field having the horizontal axis, four-pole magnetic field having an axis making an angle of 45° with respect to the horizontal axis, and a six-pole magnetic field having a vertical axis. Dynamic convergence correction signals of predetermined amplitude and direction are fed to the coils at predetermined timings in accordance with the deflection synchronizing signal.

4 Claims, 15 Drawing Figures

IN-LINE COLOR PICTURE TUBE APPARATUS WITH DYNAMIC CONVERGENCE CORRECTION DEVICE

This is a continuation of copending application Ser. No. 372,328 filed on Apr. 27, 1982.

BACKGROUND OF THE INVENTION

This invention relates to an in-line color picture tube apparatus with a dynamic convergence correction device suitable for use, for example, in an apparatus which necessitates reproduction of high resolution pictures.

Heretofore, in in-line color picture tubes, it has been general practice to use, for the correction of static convergence, a four-pole ring magnet and a six-pole ring magnet which are mounted on the outer periphery of the neck portion of the tube. When the static convergence correction is effected by moving such two ring magnets, however, the mechanical operation thus involved renders the work of correction very difficult. There consequently ensues a problem that the work calls for skill. To solve this problem, there has been proposed a device which has eight coils disposed at a spacing of 45° circumferentially of the outer periphery of the neck portion of the tube and feeds a direct electric current to the coils so as to generate a four-pole magnetic field having a horizontal axis (in the direction of the alignment of in-line electron guns), a four-pole magnetic field having an axis making an angle of 45° with respect to the horizontal axis, a six-pole magnetic field having the horizontal axis, and a six-pole magnetic field having a vertical axis and effect mutual correction of the outer beams of the in-line three electron beams in the horizontal and vertical directions and mutual correction of the outer beams and the central beam in the horizontal and vertical directions, thereby accomplishing the correction of static convergence (Japanese Patent Preliminary Publication No. 71723/76).

With the static convergence correction device of this type, although the correction of static convergence may be smoothly effected, it is difficult even by use of a self-convergence deflection yoke to effect highly accurate correction of convergence which covers the peripheral regions of the picture screen in high resolution color picture tubes. Particularly when the high resolution color picture tube is used as a terminal display unit for a computer, it is required to clearly display Chinese characters and the like characters at regions of the picture screen ranging from center to periphery. The conventional device was difficult to achieve the clear display all over the screen.

To cope with the difficulty, it becomes necessary to use means capable of correcting the residual misconvergence which escapes the correction by the self-convergence deflection yoke. To date, there has never been developed dynamic convergence correction means which has high sensitivity and yet refrains from causing any disturbance in the magnetic field of the self-convergence deflection yoke.

As well known in the art, it is essential to provide a dynamic convergence correction device in delta type electron gun color picture tube for the sake of assuring the operation of the tube. However, an in-line color picture tube apparatus with a dynamic convergence device capable of correcting a residual misconvergence that cannot be corrected by the self-convergence deflection yoke has not yet been available.

SUMMARY OF THE INVENTION

An object of this invention is to provide a novel in-line color picture tube apparatus with a dynamic convergence correction device suitable for use in high resolution color picture tubes.

Another object of this invention is to provide an in-line color picture tube apparatus with a dynamic convergence correction device capable of improving sensitivity by mounting the dynamic convergence correction device on the deflection yoke.

Another object of this invention is to provide an in-line color picture tube apparatus with a dynamic convergence correction device capable of improving sensitivity and reducing disturbance upon neighbouring elements by using rod-shaped cores in the dynamic convergence correction device.

Still another object of this invention is to provide an in-line color picture tube apparatus with a dynamic convergence correction device capable of reducing disturbance upon the deflection yoke by mounting the dynamic convergence correction device on the static convergence correction magnet assembly.

Yet another object of this invention is to provide an in-line color picture tube apparatus with a dynamic convergence correction device capable of making uniform influence of magnetic field generated by each coil upon the electron beam and improving space factor by using coil assemblies of a multilayer winding structure in the dynamic convergence correction device.

According to this invention, there is provided an in-line color picture tube apparatus with a dynamic convergence correction device comprising an in-line color picture tube, a self-convergence deflection yoke, a static convergence correction magnet assembly comprised of static convergence correction magnets and purity correction magnets, the yoke and the assembly being mounted on the tube, and dynamic convergence correction means disposed between the self-convergence deflection yoke and correction magnet assembly, the dynamic convergence correction means comprising a support member made of a non-magnetic substance, eight coil assemblies having cores fixedly disposed on the support member concentrically of the tube axis with mutual circumferential spacings, and coils wound on the cores, the coils being connected in such a manner as to generate a four-pole magnetic field having a horizontal axis, a six-pole magnetic field having the horizontal axis, a four-pole magnetic field having an axis making an angle of 45° with respect to the horizontal axis, and a six-pole magnetic field having a vertical axis, the apparatus further comprising drive circuit means for feeding to the coils dynamic convergence correction signals of predetermined amplitude and direction at predetermined timings in accordance with the deflection synchronizing signal.

DESCRIPTION OF PREFERRED EMBODIMENTS

Figure 1:
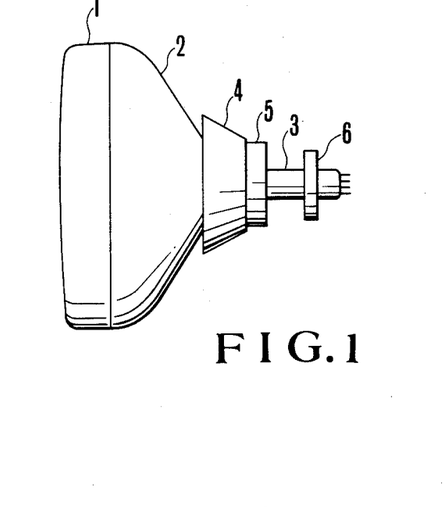
FIG. 1 is a schematic side view of a first embodiment of an in-line color picture tube apparatus with a dynamic convergence correction device according to the present invention.

In FIG. 1, reference numeral 1 denotes a panel portion, 2 a funnel portion, and 3 a neck portion containing electron guns of an in-line color picture tube of high resolution type. And, reference numeral 4 denotes a self-convergence deflection yoke fitted around the periphery of the neck portion 3 and close to the funnel portion 2, 5 dynamic convergence correction means disposed on the electron gun side of the self-convergence deflection yoke 4, and 6 a well-known static convergence correction magnet assembly comprised of static convergence correction magnets and purity correction magnet fitted around the periphery of the neck portion 3.

Figure 2:
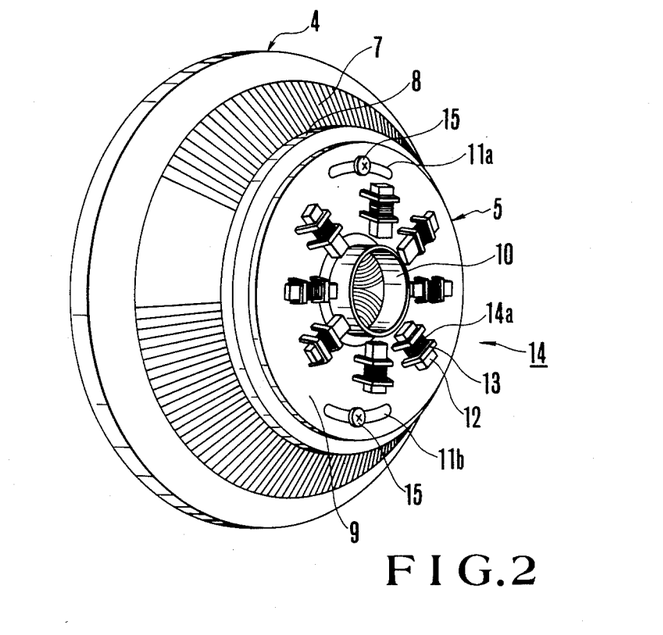
FIG. 2 is a perspective view of a dynamic convergence correction means.

In FIG. 2, reference numeral 7 denotes a deflection coil wound on the self-convergence deflection yoke 4, 8 a fringe portion of the self-convergence deflection yoke 4, 9 a circular support plate of a non-magnetic material having at the center thereof a hole 10 for the insertion of the neck portion 3 and at the peripheral region arcuately elongated slits 11a and 11b which are spaced by 180°, 14 coil assemblies including rod-shaped cores 12 of a magnetic material and fixed to the support plate 9 with the aid of fitting parts 13, coils 14a wound on the cores 12, and 15 setscrews tightened into the fringe portion 8 through the elongated slits 11a and 11b.

After the self-convergence deflection yoke 4 has been mounted on the neck portion 3, it is adjusted by turning the support plate 9 so that the center line of a pair of coil assemblies opposing to each other in the horizontal position will coincide with the horizontal axis of the in-line electron beam. After this adjustment, the support plate 9 is fixed to the fringe portion 8 by tightening the setscrews 15.

Eight cores 12 and coils 14a are radially disposed in a plane perpendicular to the axis of the tube at angular intervals of 45° along a circle concentric with the axis of the tube so that the center lines of the individual coil assemblies 14 meet at one point on the axis of the tube.

The four-pole magnetic field and the six-pole magnetic field which are generated by the eight coil assemblies 14 will now be described.

Figure 3:
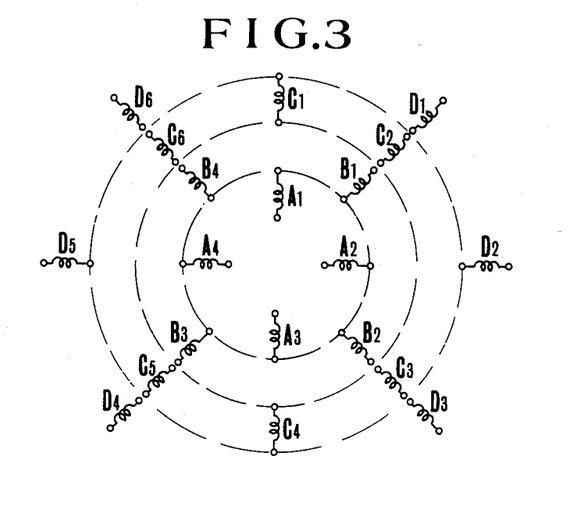
FIG. 3 is a diagram illustrating the layout of coils.
Figure 8:
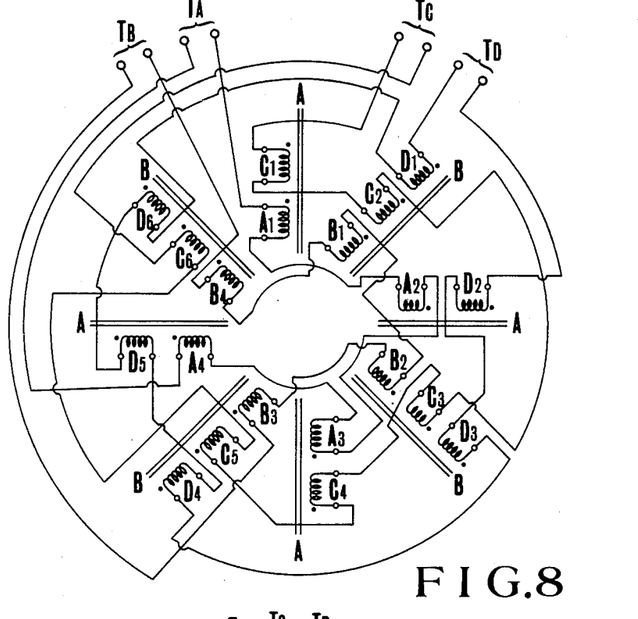
FIG. 8 is a connection diagram showing a series connection of the coils for generation of magnetic fields shown in FIGS. 4 to 7.
Figure 9:
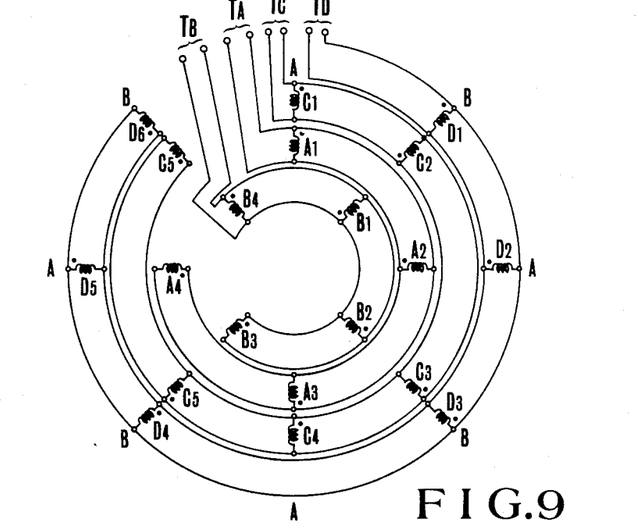
FIG. 9 is a connection diagram showing a parallel connection of the coils for generation of the magnetic fields.

FIG. 3 is illustrative of the layout of the coils 14a. These coils, respectively identified by $A_1$ to $A_4$, $B_1$ to $B_4$, $C_1$ to $C_6$ and $D_1$ to $D_6$ in FIG. 3, are connected in series or parallel with respect to external terminals (connected to an exciting source) as shown in FIGS. 8 or 9. More particularly, the coils $A_1$, $A_2$, $A_3$, and $A_4$ are either serially or parallelly connected to a first external terminal pair ($T_A$); the coils $B_1$, $B_2$, $B_3$, and $B_4$ are either serially or parallelly connected to a second external terminal pair $T_B$; the coils $C_1$, $C_2$, $C_3$, $C_4$, $C_5$, and $C_6$ are either serially or parallelly connected to a third external terminal pair $T_C$; and the coils $D_1$, $D_2$, $D_3$, $D_4$, $D_5$, and $D_6$ are either serially or parallelly connected to a fourth external terminal pair $T_D$. And, groups of the coils $A_1$ and $C_1$, the coils $B_1$, $C_2$, and $D_1$, the coils $A_2$ and $D_2$, the coils $B_2$, $C_3$, and $D_3$, the coils $A_3$ and $C_4$, the coils $B_3$, $C_5$, and $D_4$, the coils $A_4$ and $D_5$, the coils $B_4$, $C_6$ and $D_6$ are respectively wound on the same core. Specifically, the coils $A_1$, $A_2$, $A_3$, $A_4$, $B_1$, $B_2$, $B_3$, $B_4$, $C_1$, $C_4$, $D_2$, and $D_5$ are wound in N turns and the coils $C_2$, $C_3$, $C_5$, $C_6$, $D_1$, $D_3$, $D_4$, and $D_6$ are wound in $N/\sqrt{2}$ turns.

For example, assuming that the coils $A_1$ and $C_1$; $A_2$ and $D_2$; $A_3$ and $C_4$; and $A_4$ and $D_5$ involved in coil assembly groups designated by character A have each 28 turns, the innermost coils $B_1$, $B_2$, $B_3$ and $B_4$ involved in coil assembly groups designated by character B have each 28 turns and the remaining coils $C_2$ and $D_1$; $C_3$, $D_3$, $C_5$ and $D_4$; and $C_6$ and $D_6$ have each 20 turns.

A four-pole magnetic field is generated when an electric current is passed from a drive circuit to be described later to the first external terminals $T_A$ and the second external terminals $T_B$. A six-pole magnetic field is generated when an electric current is passed to the third external terminals $T_C$ and the fourth external terminal $T_D$.

With reference to FIGS. 4 to 7, the generation of four-pole and six-pole magnetic fields by the coils will be described.

Figure 4:
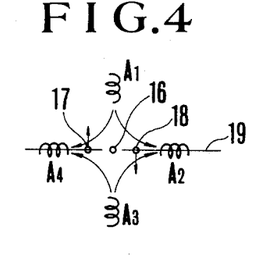
FIGS. 4 to 7 are diagrams illustrating four-pole and six-pole magnetic fields generated by the coils.

In FIG. 4, reference numeral 16 denotes a central electron beam and 17, 18 outer electron beams. A four-pole magnetic field is generated in the direction of arrow when the electric current flows in a predetermined direction through the coils $A_1$ to $A_4$. This four-pole magnetic field has a horizontal axis 19 which coincides with the horizontal axis on which the electron beams 16, 17, and 18 travel. The outer electron beams 17, 18 are shifted in vertically opposite directions because horizontal magnetic fields of opposite directions act upon these electron beams.

Figure 5:
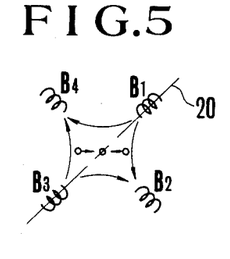

In FIG. 5, a four-pole magnetic field having an axis 20 making an angle of 45° with respect to the horizontal axis is generated when the electric current flows in a predetermined direction to the coils $B_1$ to $B_4$. Consequently, the outer electron beams 17 and 18 are shifted in horizontally opposite directions because vertical magnetic fields of opposite directions act upon these electron beams.

Figure 6:
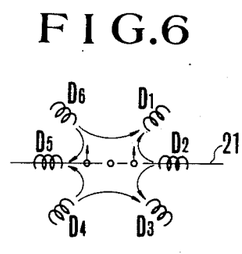

In FIG. 6, a six-pole magnetic field having an axis 21 coinciding with the horizontal axis is generated when the electric current flows in a predetermined direction to the coils $D_1$ to $D_6$. Consequently, the outer electron beams 17 and 18 are shifted in a vertical direction because horizontal magnetic fields act upon these electron beams in the same direction. Although the coils are not disposed in the configuration of a regular hexagon, this irregularity is corrected by winding the coils $D_1$, $D_3$, $D_4$, and $D_6$ in $N/\sqrt{2}$ turns.

Figure 7:
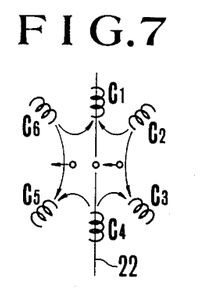

In FIG. 7, a six-pole magnetic field having a vertical axis 22 is generated when an electric current flows in a predetermined direction to the coils $C_1$ to $C_6$. Consequently, the outer electron beams 17 and 18 are shifted in the same horizontal direction because vertical magnetic fields of the same direction act on these electron beams.

Accurate dynamic convergence correction, therefore, can be effected throughout the entire picture screen by passing the electric current of the predetermined magnitude in the predetermined directions from the drive circuit to be described later to the relevant external terminals in accordance with the scanning timing.

In the previous embodiment, the dynamic convergence correction means 5 is disposed most close to the fluorescent screen on the panel portion 1 because it is provided between the self-convergence deflection yoke 4 and the static convergence correction magnet assembly 6, especially, mounted on the self-convergence deflection yoke 4. Generally, when electron beams are deflected by magnetic field, the sensitivity increases as the site of the action of the magnetic field approaches the fluorescent screen. In the first embodiment, therefore, the dynamic convergence correction means is located at the position where the best sensitivity is obtained. However, if no cores were used for the coils 14a, the sensitivity would be still insufficient so that the drive circuit would call for high electric power and the reliability of the drive circuit would be degraded. When the coils 14a are wound on cores 12 as in the present embodiment, there are generated intensive magnetic fields such that the sensitivity according to which the electron beams are deflected is as high as about ten times that obtained in the absence of the cores. If, in this case, a core of a conventional ring type having the center coincident with the tube axis is used, leakage flux of the self-convergence deflection yoke 4 would be shunted by such a ring and the effect of this phenomenon would increase in proportion as the distance between the two decreases, with the result that the deflection magnetic field would be disturbed and the convergence and purity at the peripheral regions of the picture screen would be adversely affected. When the eight rod shaped cores 12 are disposed at angular spacings and the coils 14 are wound on such cores as in the present embodiment, no appreciable effect is exerted upon the convergence and purity at the peripheral regions of the picture screen because the leakage flux from the deflection yoke is not shunted. Although the proximity of the cores 12 of magnetic substance may affect the deflection magnetic field of the deflection yoke to some extent, this effect of the cores 12 can be corrected by the swinging adjustment of the self-convergence deflection yoke 4 because the cores 12 are moved in concert with the yoke 4.

Figure 10A:
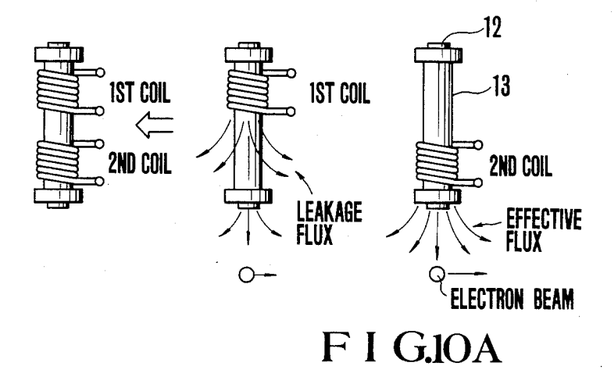
FIGS. 10A and 10B are diagrams useful in explaining a single-layer coil winding structure and a multi-layer coil winding structure, respectively.
Figure 10B:
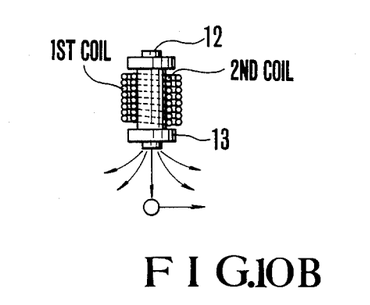

In using the rod-shaped cores 12, the core 12 is adjustably inserted (for $\mu$-adjustment) in the fitting part 13 in the form of a bobbin, and the coil is wound on the bobbin, as shown in FIGS. 10A and 10B. In case where first and second coils are wound on the bobbin 13 with a longitudinal spacing as shown in FIG. 10A to form a coil assembly having a single-layer winding structure of the first and second coils, most of the flux generated by the second coil close to an electron beam acts thereon as effective flux whereas flux generated by the first coil remote from the electron beam partly becomes leakage flux to reduce effective flux acting on the electron beam. Contrary to this, with a double-layer structure (generally plural layer structure) of the first and second coils, the leakage flux is fairly reduced so that the difference in flux density due to the first and second coils which otherwise affect the electron beam can be eliminated. In addition, the longitudinal length of the bobbin can be reduced in the multilayer winding structure as shown in FIG. 10B, thereby improving space factor. From this standpoint, the coil assembly of this invention preferably has a multilayer winding structure.

Figure 11:
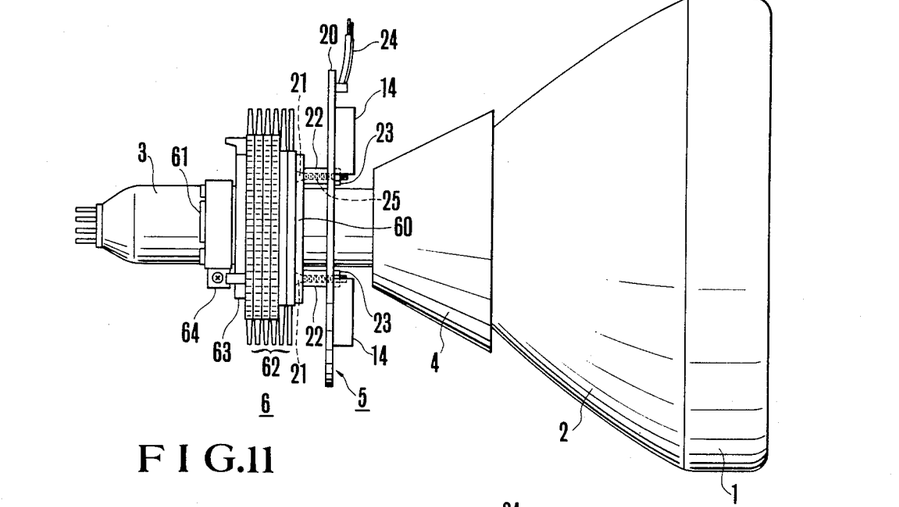
FIG. 11 is a side view of a second embodiment of the in-line color picture tube apparatus according to the invention.

Turning now to FIG. 11, there is shown a second embodiment of this invention. In the figure, the same elements as those in the previous figures are designated by the same reference numerals.

Figure 12:
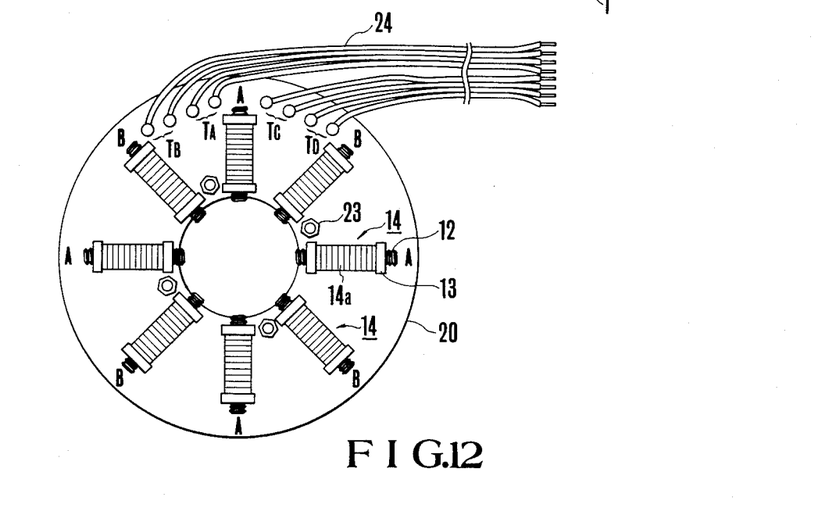
FIG. 12 is a plan view illustrating coil assemblies of the dynamic convergence correction means in the second embodiment.

A magnetic assembly 6 has a cylindrical holder 61 with a flange 60 close to a deflection yoke 4, on which ring magnets 62 for static convergence and purity adjustment are secured by means of a lock ring 63, and the assembly 6 is secured to a neck portion 3 of the tube by means of a clamping band 64. The cylindrical holder 61 is longitudinally split to ensure that the cylinder is deformed under the application of clamping force by the clamping band 64 to reduce its diameter, making intimate surface contact with the neck portion 3. As a result, the holder 61 can steadily be held in place. An insulating base plate 20 formed with a plurality of through holes 24 is fixed to the flange 60 of holder 61 mounted on the neck portion 3 by means of screws 21 of non-magnetic material which are studded in the flange 60 and passed through insulating spacers 22 and the holes 25 to be tightened by non-magnetic nuts 23. Arranged on the base plate 20 are eight coil assemblies 14 at spacings of 45°, as shown in FIG. 12, to complete dynamic convergence correction means 5. In this case, the insulating base plate 20 comprises a printed circuit board to which the coil assemblies 14 are connected.

Since, with this construction, the dynamic convergence correction means 5 is fixedly mounted to the magnet assembly 6 which in turn is fixed to the neck portion 3 by the clamping band 64, it is possible to fix, firmly and robustly, the dynamic convergence correction means 5 to the neck portion 3 of the color picture tube. In this manner, the dynamic convergence correction means 5 can be fixedly secured to the magnet assembly 6 by means of a simplified mount mechanism without impairing ease of adjustment for the static convergence correction. Further, the disposition of the correction means 5 between the deflection yoke 4 and the static convergence correction magnet assembly 6 in this embodiment also assures sensitivity characteristics comparable to those of the embodiment of FIG. 1 and yet, because of the disposition remote from the deflection yoke, disturbance by the means 5 acting upon the deflection yoke 4 can be reduced.

Obviously, coil assemblies 14 of coil assembly groups A and B in FIG. 12 are also connected as shown in FIG. 8 or 9. Reference numeral 24 designates lead wires for connection to a drive circuit.

Figures 13, 14:
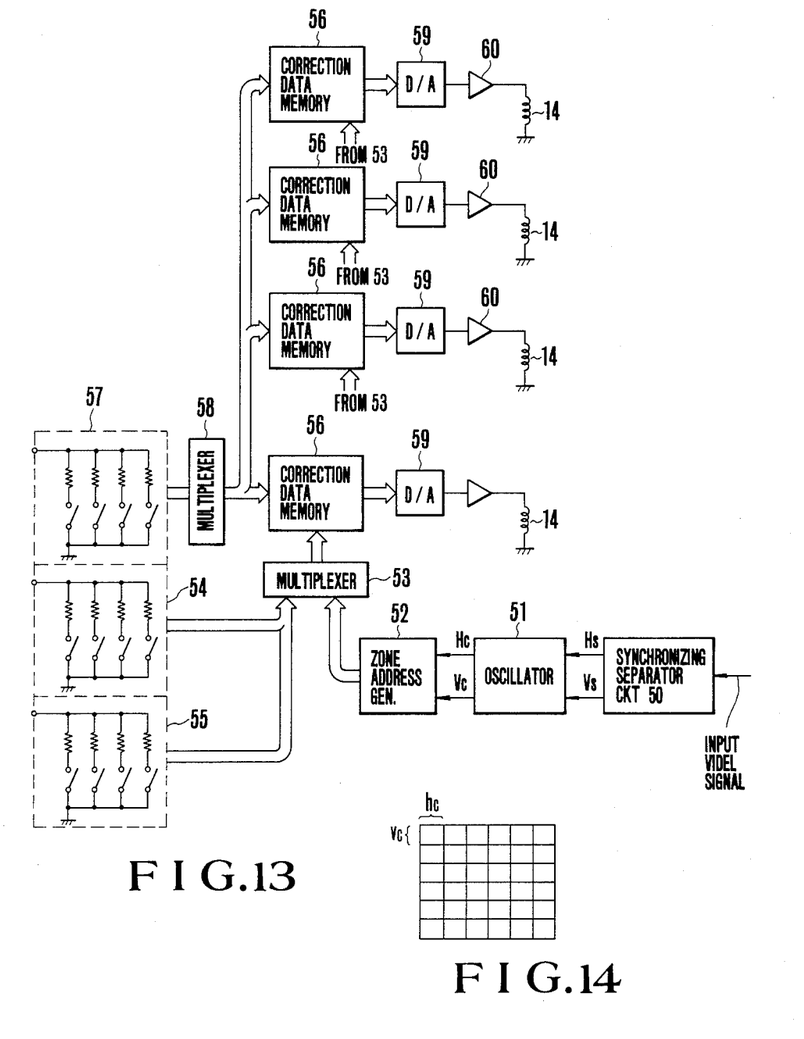
FIG. 13 is a block diagram of a drive circuit for coil assemblies of the dynamic convergence correction means according to the invention.
FIG. 14 is a diagram for explaining a pattern on the picture screen.

Shown in FIG. 13 is a block diagram of a drive circuit for the supply of dynamic convergence correction signals to the coils. An input video signal is applied not only to a signal terminal of the color picture tube through a video amplifier circuit not shown but also to a synchronizing separator circuit 50 which produces a horizontal synchronizing signal (pulse) $H_s$ and a vertical synchronizing signal (pulse) $V_s$. When the horizontal synchronizing signal $H_s$ and the vertical synchronizing signal $V_s$ are supplied to an oscillator 51 comprised of an oscillation circuit, and a counter, to constitute a PLL (phase locked loop), they are processed therein to produce a horizontal clock signal $H_c$ during the interval between successive generations of the horizontal synchronizing signals and a vertical clock signal $V_c$ during the interval between successive generations of the vertical synchronizing signals. These clock signals $H_c$ and $V_c$ have a period corresponding to a horizontal length (period) $h_c$ and a vertical length (period) $v_c$ of one of a plurality of zones into which the picture screen is divided as illustrated in FIG. 14. The horizontal clock signal $H_c$ and the vertical clock signal $V_c$ are converted into zone address signals of associated zones in a zone address generator 52 and then delivered to a multiplexer 53. The synchronizing separator circuit 50, oscillator 51 and zone address generator 52 are well known in the art and will not be described here in greater detail.

During the correction operation, the multiplexer 53 is switched so as to transmit the zone addresses from the zone address generator 52 to correction data memories 56, and each of the correction data memories 56 issues the pre-stored correction data representative of correction current needed at the zone address corresponding to the scanning beam position. A D/A converter 59 associated with the correction data memory 56 converts the correction data into a current signal which excites the dynamic convergence correction coil assembly 14.

On the other hand, upon adjustment, a desired zone can be selected by selectively operating desired switches on a horizontal address selecting unit 54 and a vertical address selecting unit 55 which are each comprised of a group of switches. When the selected signals are supplied into the multiplexer 53, the address signals indicative of the selected zones are stored in the correction data memory 56 comprised of, for example, a RAM.

In the meantime, the amount of convergence correction at the center of the individual zones is set by operating the switches of a data input unit 57 comprised of a group of switches while observing the picture on the picture screen. The amount of correction for portions deviated from the center can be determined by interpolation using the amount of correction at the center. This setting signal is applied via a multiplexer 58 to the memory 56 associated with the desired coil assembly 14, and the amount of correction for individual zones is stored in the memory. Four memories 56 are provided for the external terminals, and the setting signal is switched by the multiplexer 58 and applied to the selected memory 56. The address signal delivered out of the multiplexer 53 is applied, in parallel, to the memories 56. In operation, when scanning the individual zones at the timing corresponding to each of the zones, the correction data stored in each of the memories 56 is delivered out, converted into an analog signal, amplified at an amplifier 60, and supplied to the coil assembly 14 via the associated external terminal.

In accordance with the operation described above, required correction of convergence is effected throughout the entire picture screen by the dynamic convergence correction means 5.

As has been described, according to the in-line color picture tube apparatus with the dynamic convergence correction device, it is possible to accomplish the dynamic convergence correction and the reproduction of high resolution picture images throughout the screen without disturbance of deflection field by the self-convergence deflection yoke by disposing the dynamic convergence correction means comprised of the eight coils wound on the circumferentially spaced cores between the self-convergence deflection yoke and the static convergence correction magnet assembly, and feeding to these coils dynamic convergence correction currents of a predetermined amplitude in a predetermined direction at the predetermined timing conforming to the deflection synchronizing signals.

What is claimed is:

1. In an in-line color picture tube apparatus with an in-line color picture tube having a center beam between two side beams aligned in a plane, a self-convergence deflection yoke, a static convergence correction magnet assembly comprised of static convergence correction magnets and purity correction magnets, said yoke and said assembly being mounted on said tube, the improvement comprising dynamic convergence correction means disposed between said self-convergence deflection yoke and correction magnet assembly, said dynamic convergence correction means comprising a support member made of a non-magnetic substance, eight coil assemblies having cores fixedly disposed radially on said support member concentrically of the tube axis with mutually equal circumferential spacings, and coils wound on said cores, said coils being connected in such a manner as to generate a four-pole magnetic field having a horizontal axis which coincides with the in-line plane of the electron beams, a six-pole magnetic field having said horizontal axis, a four-pole magnetic field having an axis making an angle of 45° with respect to said horizontal axis, and a six-pole magnetic field having a vertical axis, each of the multi-pole magnetic fields producing displacement forces only on said side beams, said apparatus further comprising drive circuit means for feeding to said coils dynamic convergence correction signals of predetermined amplitude and direction at predetermined timings in accordance with the deflection synchronizing signals to achieve dynamic convergence correction over the scanned deflection field.

2. An in-line color picture tube apparatus with a dynamic convergence correction device according to claim 1 wherein said dynamic convergence correction means is mounted to said self-convergence deflection yoke through said support member.

3. An in-line color picture tube apparatus with a dynamic convergence correction device according to claim 1 wherein said dynamic convergence correction means is mounted to said static convergence correction magnet assembly.

4. An in-line color picture tube apparatus with a dynamic convergence correction device according to claim 1 wherein said coils are wound on said cores to form a multilayer winding structure.

* * * * *